United States Patent
Lyon et al.

(10) Patent No.: US 6,512,858 B2
(45) Date of Patent: *Jan. 28, 2003

(54) IMAGE SCANNING CIRCUITRY WITH ROW AND COLUMN ADDRESSING FOR USE IN ELECTRONIC CAMERAS

(75) Inventors: Richard F. Lyon, Los Altos, CA (US); Richard M. Turner, Menlo Park, CA (US); Richard B. Merrill, Woodside, CA (US)

(73) Assignee: Foveon, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/120,491

(22) Filed: Jul. 21, 1998

(65) Prior Publication Data

US 2002/0018600 A1 Feb. 14, 2002

(51) Int. Cl.⁷ .................. G06K 9/60; H01L 31/14
(52) U.S. Cl. .................. 382/305; 382/312; 250/553
(58) Field of Search .................. 382/305, 232, 382/254, 312; 369/13; 348/96, 155, 302, 308, 321, 333.01; 711/2; 257/291; 358/213; 250/553, 208.1; 365/208, 230.1

(56) References Cited

U.S. PATENT DOCUMENTS

| | | | |
|---|---|---|---|
| 3,988,619 A | 10/1976 | Malaviya et al. | 307/311 |
| 4,002,824 A | 1/1977 | Petrocelli et al. | 358/108 |
| 4,072,405 A | 2/1978 | Ozeki | 350/173 |
| 4,084,180 A | 4/1978 | Stoffels et al. | 358/55 |
| 4,129,859 A | * 12/1978 | Iwamura et al. | 340/324 AD |
| 4,539,598 A | * 9/1985 | Dietrich et al. | 358/213 |
| 4,654,714 A | 3/1987 | Hurst, Jr. et al. | 358/213 |
| 4,809,075 A | 2/1989 | Akimoto et al. | 358/213 |
| 4,839,735 A | 6/1989 | Kyomasu et al. | 358/213.31 |
| 4,942,473 A | 7/1990 | Zeevi et al. | 358/213.26 |
| 5,262,871 A | 11/1993 | Wilder et al. | 358/213.11 |
| 5,291,463 A | * 3/1994 | Ichikawa et al. | 369/13 |
| 5,412,422 A | * 5/1995 | Yamada et al. | 348/218 |
| 5,428,390 A | 6/1995 | Cooper et al. | 348/240 |
| 5,471,245 A | 11/1995 | Cooper et al. | 348/302 |

(List continued on next page.)

FOREIGN PATENT DOCUMENTS

EP    0777379    6/1997    ............ H04N/3/15

OTHER PUBLICATIONS

C. Mead, *Analog VLSI and Neural Systems*, pp. 263–267, Addison Wesley Pub. Co. 1989.

(List continued on next page.)

*Primary Examiner*—Jose L. Couso
*Assistant Examiner*—Kanji Patel
(74) *Attorney, Agent, or Firm*—Sierra Patent Group, Ltd.

(57) ABSTRACT

A scanning circuit for use with an active pixel sensor array comprises a row-address generator configured to start at a selected row-start address, stop at a selected row-stop address, and increment row addresses by a factor K. A column-address generator is configured to start at a selected column-start address, stop at a selected column stop address, and increment column addresses by a factor K. Circuitry is coupled to the row address generator and the column address generator, for storing the row-start address, the row-stop address, the column-start address, the column-stop address and the factor K. A row decoder is coupled to the row-address generator and a column selector is coupled to the column-address generator. A plurality of row select lines are coupled to the row decoder, each one of the row select lines associated with a different row in the active pixel sensor array. A plurality of column output lines are coupled to the column selector, each one of the column output lines associated with a different column in the active pixel sensor array.

15 Claims, 8 Drawing Sheets

U.S. PATENT DOCUMENTS

| | | | | |
|---|---|---|---|---|
| 5,473,616 | A | * 12/1995 | Tsutsui et al. | 371/201 |
| 5,541,402 | A | 7/1996 | Ackland et al. | 250/208.1 |
| 5,576,763 | A | 11/1996 | Acklane et al. | 348/308 |
| 5,587,738 | A | * 12/1996 | Shinohara | 348/302 |
| 5,602,585 | A | * 2/1997 | Dickinson | 348/155 |
| 5,610,873 | A | * 3/1997 | Lee | 365/230.01 |
| 5,631,704 | A | 5/1997 | Dickinson et al. | 348/308 |
| 5,739,562 | A | 4/1998 | Ackland et al. | 257/291 |
| 5,767,822 | A | * 6/1998 | Hiroshi | 345/46 |
| 5,841,126 | A | * 11/1998 | Fossum et al. | 250/208.1 |
| 5,864,362 | A | * 1/1999 | Cutler | 348/96 |
| 5,900,623 | A | * 5/1999 | Tsang et al. | 250/208.1 |
| 5,949,716 | A | * 9/1999 | Wong et al. | 365/185.29 |
| 6,058,223 | A | * 2/2000 | Strohbehn | 382/312 |
| 6,069,376 | A | * 5/2000 | Merrill | 257/291 |
| 6,175,383 | B1 | * 1/2001 | Yadid-Pecht et al. | 348/302 |
| 6,204,879 | B1 | 3/2001 | Koseki et al. | 348/230 |
| 2001/0005225 | A1 | * 6/2001 | Clark et al. | 348/302 |

OTHER PUBLICATIONS

Chye Huat Aw, et al. "A 128×128–Pixel Standard CMOS Image Sensor with Electronic Shutter" IEEE International Solid State Circuits Conference vol. 39 pp 180–181, 440 Feb. 1996.

R. Panicacci, et al. 1/4– Inch CMOS Active Pixel Sensor with Smart on–Chip Functions and Full Digital Interface, Aug. 25–26, 1997 pp: 41–53, Hot Chips IX, Stanford California.

S. Decker, et al. A 256 × 256 CMOS Imaging Array with Wide Dynamic Range Pixels and Column–Parallel Digital Output, 1998 IEEE International Solid–State Circuits Conference; pp: 176–177.

Tobi Delbruck, et al. Analog VLSI Adaptive, Logarithmic, Wide–Dynamic–Range Photoreceptor, IEEE London, May 1994, Dept. Of Computation and Neural Systems California Institute of Technology Pasadena, CA.

T. Delbruck, et al. Analog VLSI Phototransduction by continuous–time, adaptive, logarithmic photoreceptor circuits, Apr. 2, 1996, CNS Memo No. 30, cover, pp: 1–23, index.

Eric R. Fossum, Active Pixel Sensors: Are CCD's Dinosaure?, Jet Propulsion Laboratory, California Institute of Technology, 2/SPIE vol. 1900. pp: 2–14.

Sunetra K. Mendis, et al. A 128 × 128 CMOS Active Pixel Image Sensor for Highly Intergrated Imaging Systems, 1993 IEEE, IEDM 93–583, pp: 22.6.1–66.6.4.

Yoshiaki Hagiwara, Member IEEE, High–Density and High–Quality Frame Transfer CCD Imager with Very Low Smear, Low Dark Current, and Very High Blue Senitivity, 1996 IEEE, IEEE Transaction of Electron Devices, vol. 43 No. 12, Dec. 1996, pp: 2122–2130.

Alex Dickinson, et al., A 256 × 256 CMOS Active Pixel Image Sensor with Motion Detection, 1995 IEEE International Solid–State Circuits Conference, pp: 226–227.

Orly Yadid–Pecht, et al., A Random Access Photodiode Array for Intelligent Image Capture, IEEE Transactions of Electron Devices, vol. 38. No. 8, Aug. 1991, pp: 1772–1780.

Tatsuo Nomoto, et al. A 4M–Pixel CMD Image Sensor with Block and Skip Access Capability, 1997 IEEE International Solid–State Circuits Conference, pp: 186–187, 142–143, 398, 465.

Hon–Sum Philip Wong, CMOS Active Pixel Image Sensors Fabricated Using a 1.8V, 0.25–um CMOS Technology, IEEE Transaction of Electron Devices, vol. 45, No. 4, Apr. 1998, pp: 889–894.

R. Daniel McGrath, et al. Current–Mediated, Current Reset 786 × 512 Active Pixel Sensor Array, 1997 IEEE International Solid–State Circuits Conference, pp: 183–182–3, 1997 ISSCC Slide Supplement/IEEE pp: 138–139.

Carver A. Mead, et al. Scanners for Visualizing Activity or Analog VLSI Circuitry, California Institute of Technology Computation and Neural Systems Program, Jul. 5, 1991, CNS Memo 11, pp: 1–29.

Steven J. Decker., A Wide Dynamic Range CMOS Imager with Parallel On–Chip Analog–to–Digital Converson, Massachusetts Institute of Technology, Sep. 1997, pp: 1–205.

* cited by examiner

IMAGE SCANNING CIRCUITRY WITH ROW AND COLUMN ADDRESSING FOR USE IN ELECTRONIC CAMERAS

BACKGROUND OF THE INVENTION

1. Field of the Invention

The present invention relates to image sensor array technology for use in electronic cameras employing solid state pixel sensor arrays. More particularly, the present invention relates to image scanning techniques for displaying a high-resolution image sensor pixel array onto a viewscreen of lower resolution.

2. The Prior Art

Active pixel sensor arrays are well known in the prior art. Readout techniques for active pixel sensor arrays combine pixel sensor addressing schemes with scanning circuitry suitable for reading solid state sensor arrays. Exemplary scanning circuitry suitable for vertical and horizontal scanning is described in Analog VLSI and Neural Systems, by Carver A. Mead, Addison Wesley Publishing Co., 1989, at pp. 263–267.

Pictures from active pixel sensor arrays are often displayed onto viewscreens which have a lower resolution than the active pixel sensor array itself does. In order to fit the picture onto the viewscreen, some pixels are not displayed. Two known methods of skipping some of the pixel sensors in the array are panning and zooming. Panning involves changing the start location of readout along the vertical or horizontal active pixel sensor array axis. Zooming involves mapping an image of higher resolution onto a viewscreen of lower resolution. Such zooming is accomplished by selectively displaying only a portion of the total rows and columns of active pixel sensor array data.

The prior art pixel sensor addressing schemes employed by scanning circuitry for active pixel sensor arrays are generally capable of either the random access of individual pixel sensors, or the sequential access of pixel sensors. The random accessing of pixel sensors allows for the readout of any individual pixel sensor in the active pixel sensor array. Sequential access allows for the readout of all of the pixel sensors in an active pixel sensor array, where each frame is scanned out one line at a time.

Some prior art imaging systems read out the entire active pixel sensor array and store the image data in memory. Subsequent manipulations are performed on the memory to access selected portions of the image data for display onto a viewscreen of lower resolution. Such imaging systems necessitate reading out the entire active pixel sensor array regardless of what image data is actually desired.

Other prior art imaging systems use off-chip processing circuitry to determine which portions of pixel sensor data are desired for display. The entire active pixel sensor array is read out sequentially. While readout is occurring, a timing controller selectively transfers only the pixel sensor data desired to the viewscreen display. Such imaging systems also necessitate reading out the entire active pixel sensor array.

Still other prior art imaging systems can be adjusted to change the number of pixel sensors read out at a given time. Such imaging systems are able to read out multiple pixel sensors simultaneously to produce a single average value. This technique increases the scanning speed of the imaging system while decreasing the resolution of the sensor array data. However, such systems involve additional circuitry to average the pixel sensor values.

In prior-art systems using random-access imager arrays, external logic could be used to select rows and columns for pan and zoom, but this requires high-speed address busses and added logic which may be a speed bottleneck.

In the art of color electronic imaging, it is necessary to resolve the incoming image into three color channels. Prior art active pixel sensor arrays are typically combined with a color separation prism, which splits the incoming image into three separate images, one in each wavelength range. Three separate active pixel sensor arrays are used in conjunction with the color separation prism, each capturing the image from one wavelength range. When the image data from the three separate active pixel sensor arrays are recombined, they form the basis of a color image.

Prior art color separation prisms such as that disclosed in U.S. Pat. No. 4,084,180, issued Apr. 11, 1978 to Stoffels et al., resolve an incoming image into three separate color beams. All beams exiting the color separation prism have the same image orientation, and thus none of the three-color separation beams are mirrored compared to the other color beams. However, this type of color separation prism has the disadvantage of requiring an air gap within the prism itself to achieve the same image orientation for all three-color separation beams. Such prisms can be difficult to manufacture properly.

A second type of color separation prism, such as that disclosed in U.S. Pat. No. 4,072,405, issued Feb. 7, 1978 to Ozeki, avoids the necessity of having an air gap within the prism. However, this color separation prism produces three different color beams wherein one beam's orientation is a mirror image as compared to the other two color beams' orientations. The active pixel sensor array receiving this mirrored color beam should be able to reverse its image readout direction to match the image orientation of the other two color beams.

It is an object of the present invention to provide scanning circuitry for an active pixel sensor array with row and column addressability that can combine the features of an arbitrary pixel sensor readout starting location with a sequential pixel sensor addressing mode. Different scanning modes with different image resolutions are achieved by counting pixel sensor rows in steps of Kn for row addressability and counting pixel sensor columns in steps of Km for column addressability, allowing for selective pixel sensor skipping. Selective pixel sensor skipping allows for increased scanning speed and decreased image resolution, producing an image suitable for viewing on a low-resolution viewscreen.

It is another object of the present invention to provide on-chip scanning logic for row and column addressing to perform sequential pixel sensor addressing with pan and zoom modes.

Yet another object of the present invention is to provide easy panning control, which changes the start readout location along the vertical and horizontal dimensions of the active pixel sensor array. Each sequential pixel sensor addressing mode allows for an arbitrary pixel sensor readout starting point.

Yet another object of the present invention is to provide a means for storing several values of Kn and Km on-chip, to provide for several different image resolutions.

Yet another object of the present invention is to provide a means for selectively complementing the row or column pixel sensor address counting sequence during pixel sensor selection. This feature is useful when the active pixel sensor arrays are used with a color-separation prism whereby some prism outputs may be mirrored. The pixel sensor address complementing feature returns the mirrored prism output to the standard output orientation. The complementing feature is available for both the row and column pixel sensor selection. This allows the active pixel sensor arrays receiving each color separation beam to be placed in any orientation (all vertical or all horizontal, with 180-degree rotation being allowed).

BRIEF DESCRIPTION OF THE INVENTION

The present invention describes an apparatus and a method for scanning an active pixel sensor array that provides multiple pixel sensor addressing modes. The apparatus and method are used in conjunction with a solid state active pixel sensor array for use in either a still or video digital camera. A preferred active pixel sensor array with which the present invention may be used comprises a plurality of integrating photosensors placed in rows and columns. Each photosensor on a row is connected to a common row select line. Each photosensor on a column is connected to a common column output line. Illustrative different types of active pixel sensor arrays suitable for use with the scanning apparatus disclosed herein are described in U.S. Pat. Application Ser. No. 08/969,383, "INTRA-PIXEL FRAME STORAGE ELEMENT, ARRAY AND ELECTRONIC SHUTTER METHOD SUITABLE FOR ELECTRONIC STILL CAMERA APPLICATIONS", to Merrill et al filed on Nov. 13, 1997, U.S. Pat. Application Ser. No. 09/031,333, "EXPOSURE CONTROL IN ELECTRONIC CAMERAS BY DETECTING OVERFLOW FROM ACTIVE PIXELS", to Merrill et al., filed on Feb. 26, 1998, although the present invention will be advantageous when used with other types of pixel storage elements and arrays.

The image scanning apparatus described herein is capable of performing both high-resolution scanning modes and low-resolution scanning modes. The user is able to arbitrarily select the starting point for the image scan, and also to select a mode in which to view the image. The availability of different image viewing resolutions is useful when the active pixel sensor array is a high-resolution array with N rows and M columns of pixel sensors, and the viewscreen used for display has a lower resolution and fewer rows and columns for pixel display. It is not possible to display all pixels from the high-resolution pixel array onto the viewscreen, and a method for selecting which pixels to display is necessary.

High-resolution full image capture occurs when the scanning circuitry reads out all of the pixel sensors sequentially from the entire active pixel sensor array. This full image capture mode of readout is too large to fully display onto the low-resolution viewscreen.

High-resolution partial image display mode occurs when only a selected portion of the total pixel array is displayed onto the viewscreen. The user selects an arbitrary individual pixel sensor for beginning readout. The image scanning apparatus is capable of accessing any starting location within the active pixel sensor array. This allows image scanning to begin at any selected location within the pixel sensor array. The image scan will proceed sequentially from the initial address, displaying each pixel from the pixel sensor array onto the viewscreen until a predetermined number of rows and columns has been displayed. This arbitrary start point addressing feature allows a selected portion of the high-resolution pixel sensor array to be displayed onto a viewscreen of lower resolution, without sacrificing any detail.

The full frame viewscreen display mode allows the entire high-resolution N rows by M columns pixel sensor array to be displayed onto a viewscreen of lower resolution. The full frame viewscreen mode, by counting in steps of Kn for row addressability and counting in steps of Km for column addressability, selectively skips rows and columns of the active pixel sensor array when selecting pixel sensors to display onto the viewscreen. This selective skipping allows the higher-resolution pixel array to be mapped onto the lower-resolution viewscreen. Selective pixel sensor skipping will cause some image detail to be lost, but the user will be able to see a lower-resolution version of the entire image.

In the full frame viewscreen mode, Kn and Km may be determined by finding the smallest whole values of Kn and Km that will allow the full pixel sensor array to be mapped onto the viewscreen. To maintain the aspect ratio of the image, it is typically preferable to use equal values of K (Kn=Km) in the two dimensions, even though the invention and the embodiment disclosed herein will support different values of Kn and Km. For example, if the viewscreen can only display Vr rows and Vc columns of pixels:

$$K=\text{ceiling } (\max (N/Vr, M/Vc))$$

where the ceiling function means the least integer that is equal to or greater than its argument.

Additional medium zoom modes of display are also available. Different values of Kn and Km may be selected, allowing for different resolution display modes. Several Kn and Km storage registers are provided in the scanning circuitry, allowing different values of Kn and Km to be selected by the user. This makes multiple resolution levels available. For the additional medium zoom modes of display, the user may arbitrarily select the starting location.

The scanning apparatus is thus capable of displaying several different viewing modes onto a viewscreen. In high-resolution full image capture, the entire active pixel sensor array is read out. The entire image will not fit onto the viewscreen in this mode. In high-resolution partial image display mode, the user may choose an arbitrary starting point from which the scanner will sequentially display the image from the pixel sensor array onto the viewscreen. No pixel sensors within the displayed region are skipped in this mode, and generally not all of the pixels will be displayed onto the viewscreen. In the full frame viewscreen display mode, the entire image from the pixel sensor array will be displayed onto the viewscreen. In order to accomplish this, it is necessary to selectively skip pixel sensors in order to display the full image. Several medium zoom modes are also available between the two extremes of high-resolution full image capture mode and full frame viewscreen display mode.

It is envisioned that a user would first choose to view the image from the pixel sensor array in the low-resolution full frame viewscreen display mode to get an overall view of the image. The user could then select a smaller area of the image for viewing in one of the medium zoom modes, eventually proceeding to high-resolution partial image display mode for viewing the smallest area of interest within the image.

The scanning circuitry disclosed herein uses row and column address counters to determine the addresses of pixel sensors to be read out from the active pixel sensor array. The row and column address counters provide pixel sensor addresses to the row decoder and column selector, which in turn perform the actual pixel sensor readout. The selective row and column skipping schemes described above for the various pixel sensor selection modes of the scanning circuitry are implemented using values of Kn and Km stored within the row and column address counters.

Complementors are also included in each row and column address counter, allowing for image mirroring in both the X and Y directions. The use of a color-separation prism within the camera to resolve the incoming image into three color channels means that one or more of the color separation beams may have an orientation that is mirrored with respect to the other color separation beams. The X and Y complementors allow the orientation of a particular color separation image to be reversed, putting it back into the correct orientation to be recombined with the other color separation beams.

The X or Y complementors will, if activated, reverse the scanning order for either the rows or the columns. Thus, instead of starting at row zero and progressing to row Kn, the row-address counter will instruct the row decoder to start reading pixel sensors at the opposite edge of the pixel sensor matrix (2047, for example) and count down by Kn to 2047-Kn. The complementors are controlled by a bit indicating the desired image parity in each direction. If the active pixel sensor array in question receives a color separation beam with a mirrored orientation, the complementor feature can be activated for the scanning circuitry associated with that particular active pixel sensor array. The color-separation prism will require one dimension to be complemented, depending on the actual spatial orientation of the active pixel sensor arrays and the orientation of the color-separation prism itself.

BRIEF DESCRIPTION OF THE DRAWING FIGURES

DETAILED DESCRIPTION OF A PREFERRED EMBODIMENT

Those of ordinary skill in the art will realize that the following description of the present invention is illustrative only and not in any way limiting. Other embodiments of the invention will readily suggest themselves to such skilled persons.

Figure 1:
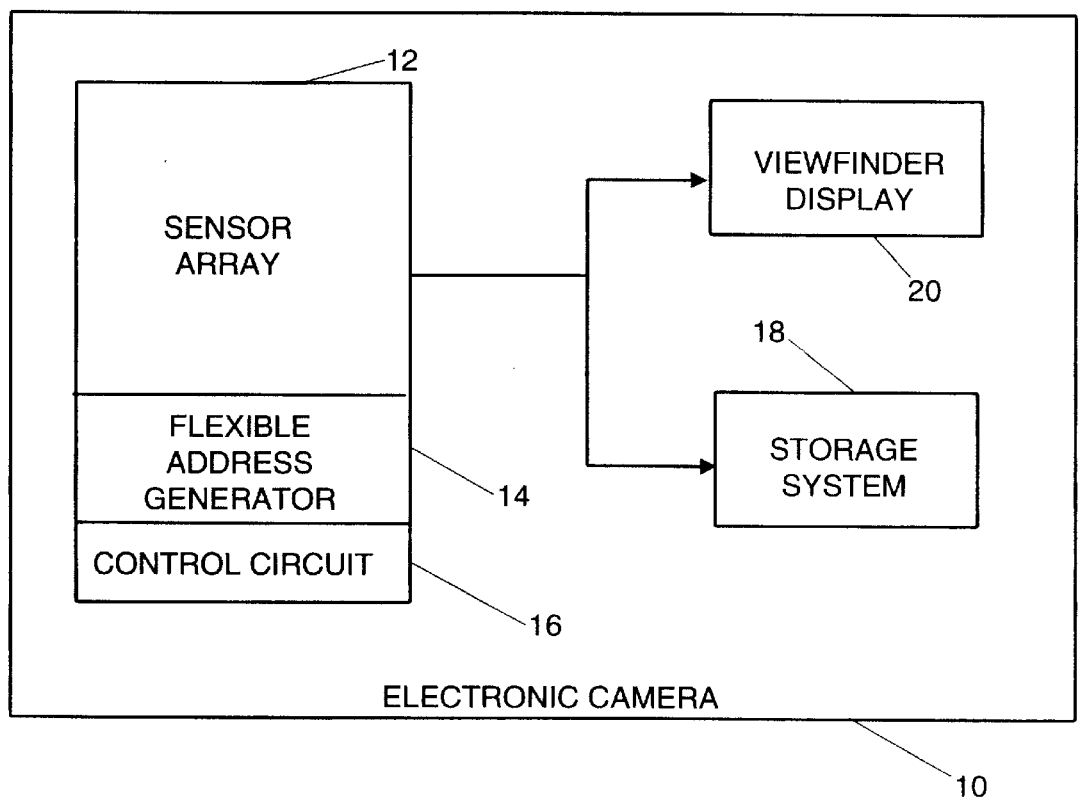
FIG. 1 is a block diagram of an electronic camera employing scanning circuitry of the present invention.

Referring first to FIG. 1, a block diagram of an electronic camera 10 employing the scanning circuitry of the present invention is shown. Electronic camera 10 includes a pixel sensor array 12, such as an active pixel sensor array. According to the present invention, pixel sensor array 12 is controlled by a flexible address generator circuit 14. Flexible address generator circuit 14 is controlled by a control circuit 16 that provides all of the signals necessary to control reading pixel data out of the array 12. The flexible address generator circuit 14 and control circuit 16 may be used to read full high-resolution image data out of the pixel sensor array 12 and store that data in storage system 18. The pixel sensor array 12 is a high-resolution active pixel sensor array suitable for use in digital still or video cameras. Such active pixel sensor arrays are generally displayed onto a viewscreen so that the user can view and adjust the image. The flexible address generator circuit 14 and control circuit 16 may also be integrated on the same silicon as sensor array 12 and may be used to provide pixel data to a viewfinder display having a resolution lower than that of the full image produced from the pixel sensor array 12.

Figure 2:
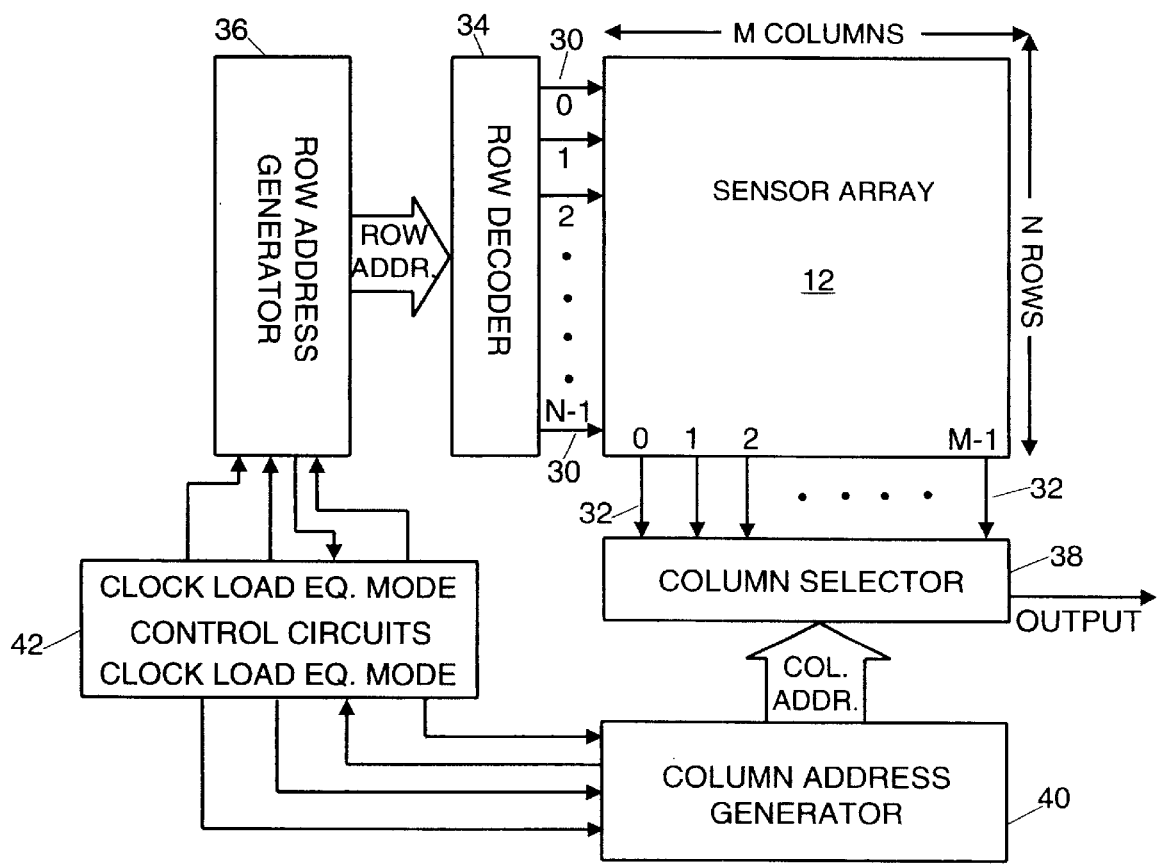
FIG. 2 is a block diagram showing the main components of scanning circuitry for an active pixel sensor array according to the present invention.

Referring now to FIG. 2, a block diagram shows illustrative scanning circuitry comprising the flexible address generator circuitry 14 and control circuitry 16 of FIG. 1 in more detail. The main components of a preferred embodiment of the scanning circuitry are shown in FIG. 2. The active pixel sensor array 12 has N rows and M columns of pixel sensors. The active pixel sensor array 12 is connected to the rest of the scanning circuitry components through the row select lines 30, and the column output lines 32. There is a single row select line for each row of pixel sensors in the active pixel sensor array 12, and also a single column output line for each column of pixel sensors in the active pixel sensor array 12. Thus for the active pixel sensor array 12 shown there are N row-address lines 30 and M column output lines 32.

The row-address line signals are generated by row-address decoder 34 driven from row address generator 36. The column line output selection is performed by column selector 38 driven from column address generator 40. Column selector 38 may comprise a decoder or other multiplexing means as is known in the art. The row address generator 36 and column address generator 40 may be thought of as generalized counters and are controlled by control circuitry 42.

In FIG. 2, control circuits 42 are not detailed and may be easily implemented to control the row and column address generators 36 and 40 by persons of ordinary skill in the art from the functions specified herein that will allow the active pixel sensor array to be repeatedly initialized and read out, depending on the initialization and control needs of the chosen imager array.

Row address generator 36 and column address generator 40 are loadable counters operating under the control of control circuits 42. Each counter is loaded with a starting address and is then clocked to count by an increment K until a stop address is reached at which time it provides an "Equal to stop" output signal to the control circuit. The counter is then reset to the start address and the sequence begins again. The counters in row and column address generators 36 and 40 include registers for storing the values of the start address, the stop address, and the value of K, in sets for one or more modes. The control circuitry 42 and row and column address generators 36 and 40 are arranged to clock through each selected column in a row, and then increment the row address generator by K to clock each selected column in the next selected row.

The "Equal to stop" signal out of the row address generator signals the final row and the control circuits 42 subsequently cause an initialization of the sensor array, so that a new image will be captured after each full cycle of rows is completed.

Persons of ordinary skill in the art of sensor arrays will realize that other timing signals and delays may be needed between rows or between images, and that delay elements and other logic and timing elements can be employed to realize such delays and additional timing signals, and to synchronize the image exposure and readout to the other parts of the camera system. Control circuits 42 are not a critical part of the embodiment of the invention, and would typically not be fabricated on the same silicon substrate with the sensor array and flexible addressing circuitry of the invention. The Mode Data lines show in FIG. 2 indicate typical paths both for storing mode definition data in the registers of the counters, and for selecting a mode to be operative at any particular time. The complement control signal for each counter is included in the Mode Data.

As will also be apparent to persons of ordinary skill in the art, the stop detection feature of the flexible address generator of the present invention is optional and the function that it performs could be implemented in a number of different ways in alternate embodiments of the invention. For example, the control logic that sends image data from the imager to a storage system can count rows and columns and stop when a predetermined amount of pixel data has been sent. Also, the unit receiving the pixel data from the array could count the rows and columns and signal the controller to stop when a predetermined amount of pixel data has been received. Whichever of these schemes is employed, the present invention provides the advantage that no count or address information is required to be sent in real time to or from the imager integrated circuit.

A complement control signal is used if it is desired to mirror the image from the active pixel sensor array 12 in either the X or the Y direction. An image is normally split into three different color beams by a color separation prism, and each separate color beam is sent to a different active pixel sensor array. Such prisms may produce one color separation beam that is mirrored with respect to the other two color separation beams. Re-mirroring by readout reversal may then be necessary to return a particular color beam image to the same orientation as the other color beam images before the three color separation beams are recombined to form the final image. The complement control signal will reverse the pixel sensor addressing scheme of the row or column-address counter by subtracting the count from the highest row or column address. In the typical case of an imager having a size equal to a power of two, this subtraction is known as a "one's complement", which is an inversion of each bit, causing the particular active pixel sensor array to be read out in a mirrored fashion and returning the resulting image to the desired orientation.

After receiving a Load signal from the control circuits 42, the row address generator 36 loads from its mode data the address of the first row of pixel sensors to be selected from the active pixel sensor array 12. Each time the row address generator 36 is clocked, it provides the address of the next row to be selected to the row decoder 34. The row-address counter 36 is designed to hold several different row-address calculation modes corresponding to different modes of image resolution output.

The row address generator 36 implements a count-by-Kn scheme to selectively skip certain rows of pixel sensors of the active pixel sensor array 12. For example, in detail mode where no pixel sensors are skipped, Kn=1 and the row address generator 36 will not direct the row decoder 30 to skip any rows. In both the medium and full zoom modes, Kn>1 and the row address generator 36 will increment its calculation of the address of the next row to be selected by Kn. The row address generator 36 will provide each calculated row address to the row decoder 34. In medium zoom and full frame viewscreen display modes, certain rows on the active pixel sensor array 12 will be skipped over during array readout.

The address of each row to be selected is provided by the row address generator 36 to the row decoder 34, which selects the proper row select line 30 based upon the address provided as is known in the art. Selecting a row line refers to placing a signal on the row line to activate the select nodes of the pixel sensors associated with the selected row line.

The column address generator 40 functions in the same manner as the row address generator 36. Once a Load signal is received from the control circuits 42, the column address generator 40 loads from its mode data the first column address to be read from the active pixel sensor array 12. The column address generator 40 implements a count-by-Km scheme to calculate the address of the subsequent columns to be selected. The column-address counter 40 then provides the column address to the column selector 38. The addressing scheme of the column address generator 40 causes the column selector 50 to selectively skip certain columns of pixel sensors on the active pixel sensor array 12. The column address generator 40 is designed to hold several sets of start, Km, and stop data, allowing for different modes of image resolution and position output.

Several different embodiments of the column selector 38 are possible. The column selector 38 may comprise a column decoder coupled to the column output lines and a pixel value output line via a switch. The switch allows the column decoder to turn on the proper column output line, and sends the desired pixel sensor output value from that column to the pixel value output line. Alternatively, the column selector 38 may comprise a binary tree column selector coupled to the column-output lines.

Figure 3:
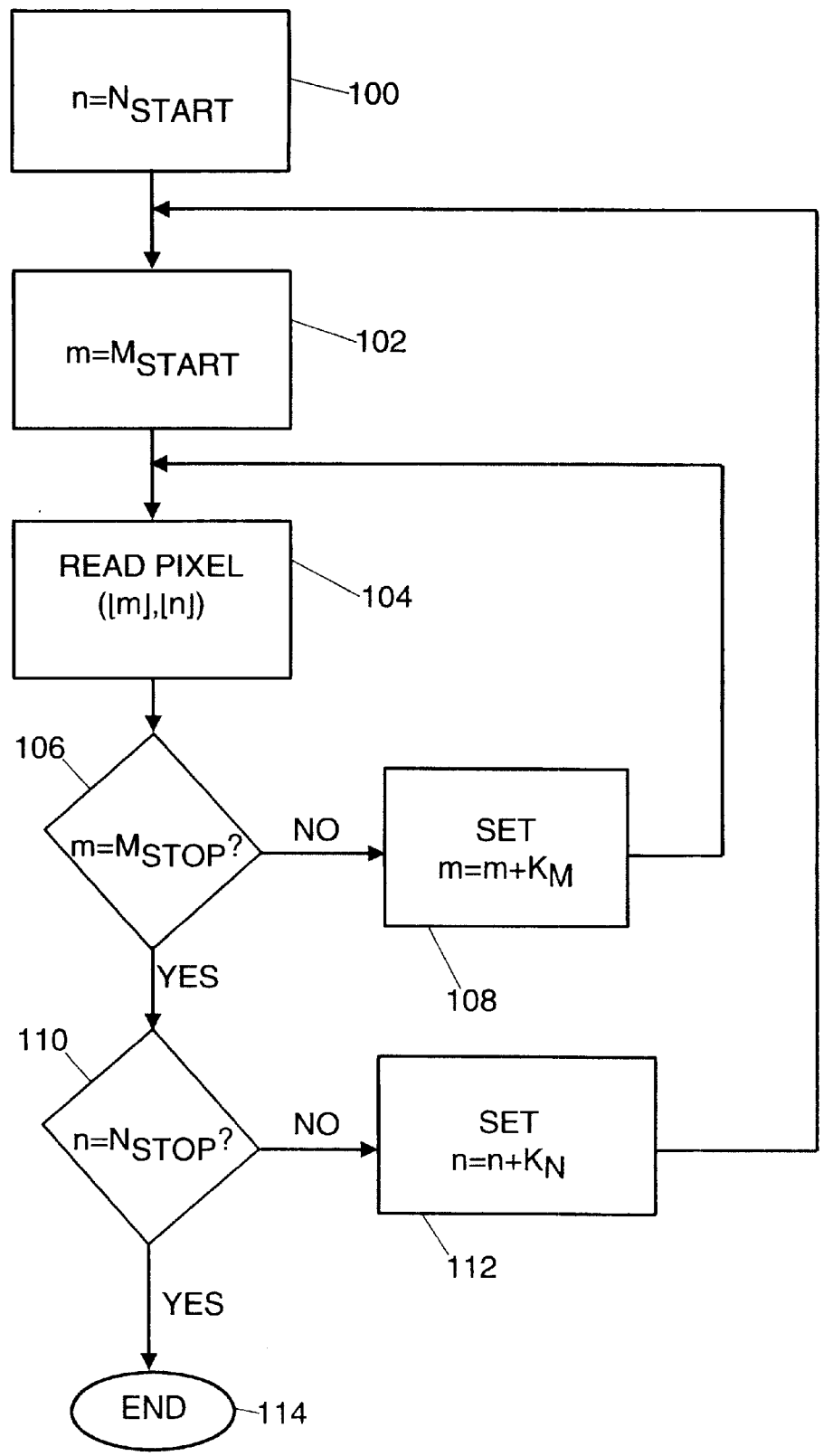
FIG. 3 is a flowchart illustrating the method of address counting logic used within the row and column address counters for pixel sensor selection.

FIG. 3 is a flowchart illustrating the preferred method of implementing the pixel sensor selection scheme for the various pixel sensor selection modes performed by the scanning circuitry. In this flowchart, the current row address number is given as n, and the current column address number is given as m. The logic implements a count-by-Kn row skipping scheme and a count-by-Km column skipping scheme. Readout begins at row Nstart and column Mstart, and stops at row Nstop and column Mstop.

First, at step 100, the scanning circuit initializes the first row address number to be selected n=Nstart. At step 102, the scanning circuit initializes the first column-address number to be selected m=Mstart. At step 104, the scanning circuit reads out pixel sensor (n, m). The scanning circuit will then check to see if it has reached the last desired column in the row it is currently reading. At step 106, the scanning circuit determines whether m=Mstop? If no, the scanning circuit increments the column-address number count at step 108, setting m=m+Km. The scanning circuit then returns to step 104. If yes, the scanning circuit proceeds to step 110.

If m=Mstop was true at step 106, then in step 110 it is determined whether n=Nstop and the row count equals the last desired row. If no, the row count is set to n=n+Kn at step 112. The scanning circuit then proceeds back to step 102, where it will reinitialize the column-address back to Mstart and continue selecting pixel sensors from the next row. If yes, all desired pixel sensors have been read and the pixel sensor readout ends at step 114.

Each pixel sensor array readout mode will have different values of Nstart, Mstart, Nstop, Mstop, Kn and Km. In high-resolution partial image display mode, the user will select Nstart and Mstart. This mode does not skip any pixel sensors and thus Kn and Km will both be equal to 1. Nstop and Mstop will be determined by the size of the viewscreen in relation to the size of the active pixel sensor array. The scanning circuit will read pixel sensors from the active pixel sensor array sequentially from the arbitrarily selected starting location until no more pixel sensors can be displayed onto the available viewscreen space.

In full frame viewscreen display mode, the entire image is displayed on the viewscreen and thus Nstart and Mstart may both be equal to zero. For an N row by M column active pixel sensor array, Nstop and Mstop will be set to the greatest multiple of Kn and Km less than N and M, respectively, so that counting by Kn and Km from zero will exactly reach the stop values. Alternately, rather than a simple equality detector, a digital magnitude comparator may be used so that the stop values N-Kn and M-Km can be used. Kn and Km will be determined based upon the ratio of the active pixel sensor array size to the viewscreen size.

For the medium zoom modes, Nstart and Mstart are arbitrarily selected by the user. Kn and Km will be previously-stored values chosen to produce a viewscreen image resolution in between high-resolution partial image display mode and low-resolution full frame viewscreen mode. Nstop and Mstop will be determined by the size of the viewscreen and the Kn and Km values. The scanning circuitry will read pixel sensors from the active pixel sensor array sequentially, counting rows by Kn and columns by Km. Active pixel sensor array readout will begin from the arbitrarily selected start location and proceed until no more pixels can be displayed onto the viewscreen.

Figure 4A:
FIGS. 4a through 4c are, respectively, a full image, and images obtained using different modes of the scanner of the present invention.
Figure 4B:
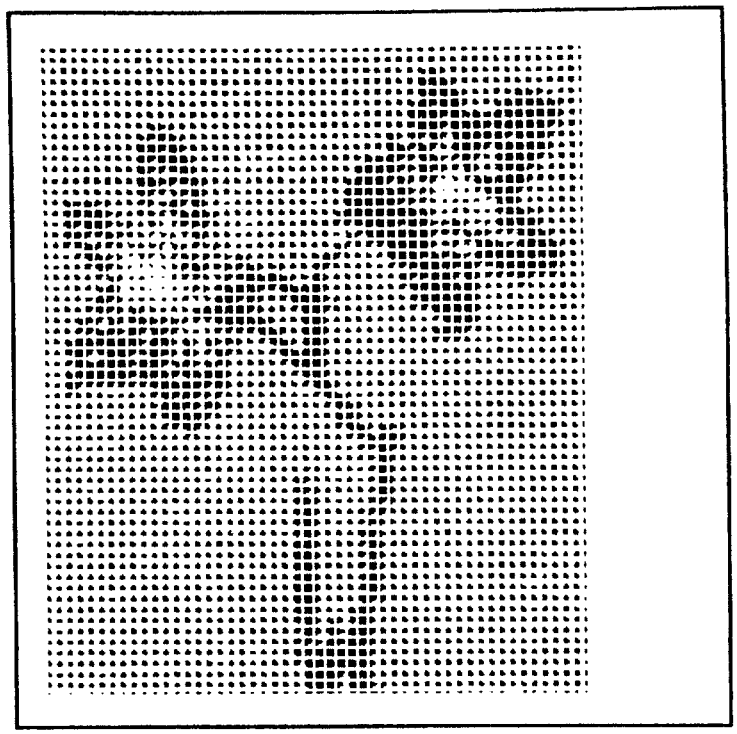
Figure 4C:
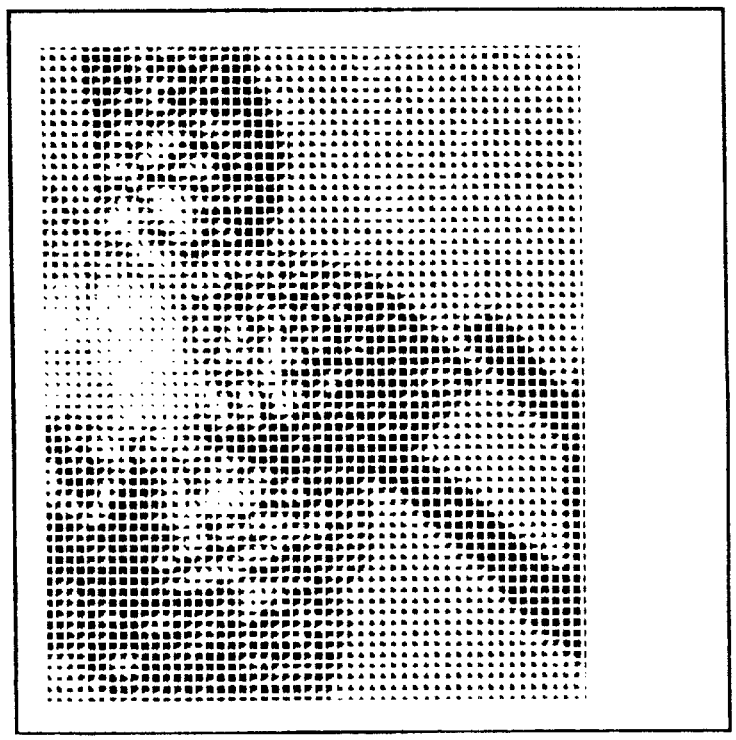

Referring now to FIGS. 4a through 4c, examples of images produced using different modes of the scanner of the present invention are shown in comparison to the entire image stored in the array. FIG. 4a depicts an entire image displayed from a 180 row by 150 column sensor array. FIG. 4b shows a 60 row by 50 column image obtained on a 66×66 pixel display screen by setting K=3. FIG. 4c shows a 60 row by 50 column detail image obtained by setting K=1.

The pixel sensor addressing method shown in FIG. 3 is designed for an active pixel sensor array comprised of rows and columns of pixel sensors arranged in an x-y matrix. While this x-y coordinate system matrix is currently the preferred embodiment of the active pixel sensor array, the pixel sensor selection method shown can also be applied to matrixes using different coordinate systems.

Figure 5:
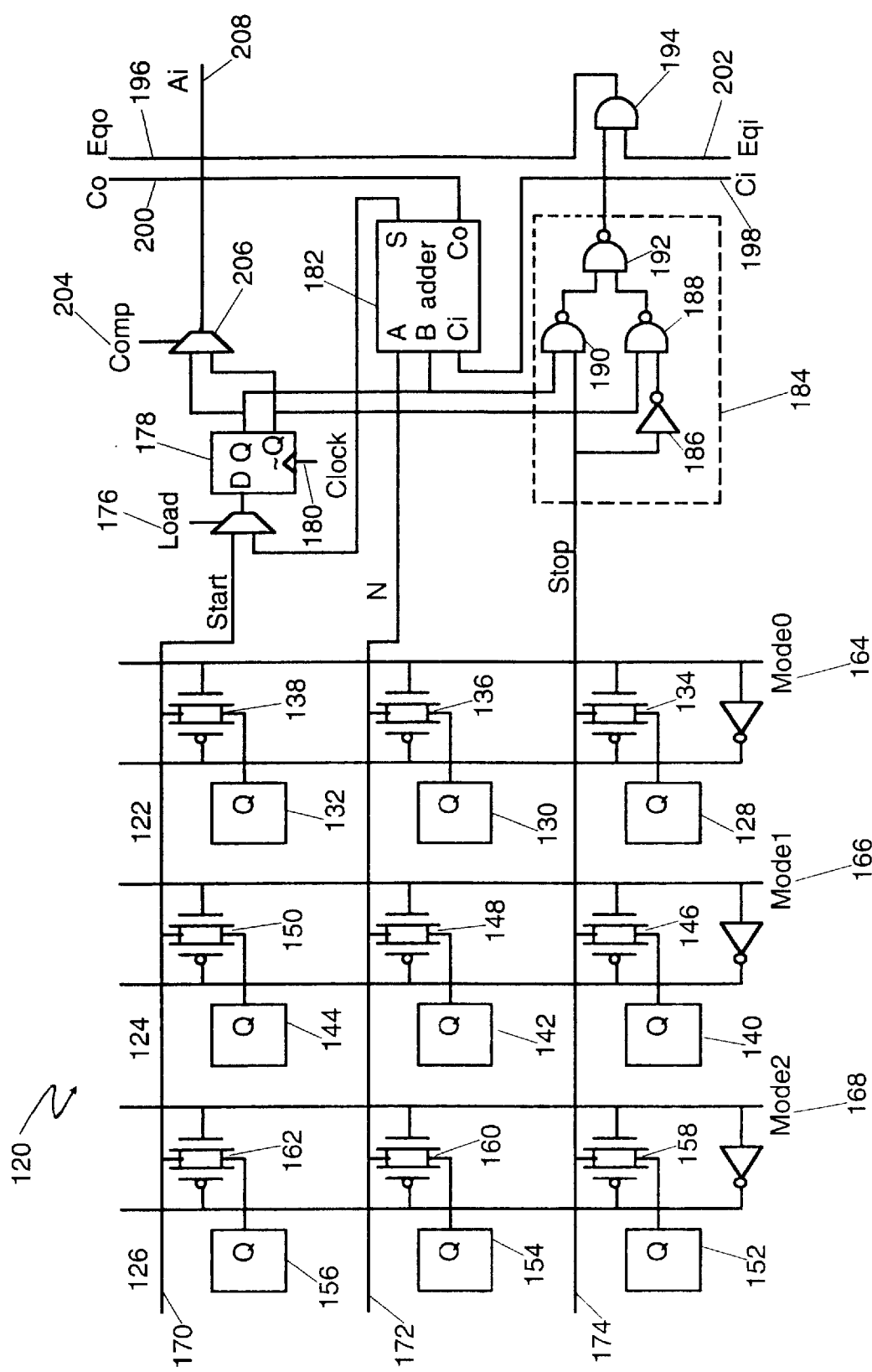
FIG. 5 is a schematic diagram of an illustrative 1-bit slice of a representative flexible address generator for use in the scanning circuitry associated with an active pixel sensor array.

The components for an illustrative embodiment of both row address generator 36 and column address generator 40 are shown in FIG. 5. FIG. 5 is a schematic diagram illustrating a one bit slice of a flexible address counter 120. The total number of bits used in the flexible address counter 120 will depend upon the size of the active pixel sensor array. A larger pixel sensor array size will require a higher maximum row and column-address count and thus additional flexible address counter bits.

The flexible address generator 120 has three groups of registers for storing three groups of address selection parameters: mode0 produced by the group of registers 122, mode1 produced by the group of registers 124, and mode2 produced by the group of registers 126. Each group of registers contains three register bits and three CMOS transmission gates. Group 122 corresponding to mode0 contains register bits 128, 130, and 132 and CMOS transmission gates 134, 136, and 138. Group 124 corresponding to mode1 contains register bits 140, 142, and 144 and CMOS transmission gates 146, 148, and 150. Group 126 corresponding to mode2 contains register bits 152, 154, and 156 and CMOS transmission gates 158, 160, and 162. Selection between the mode0, mode1, and mode2 data stored in the registers is made using the mode0, mode1, and mode2 control lines 164, 166, and 168, respectively.

Persons of ordinary skill in the art will appreciate that the three different groups of registers shown in FIG. 5 are purely illustrative. The flexible address generator 120 can have any number of register groups corresponding to different pixel sensor selection modes of the scanning circuitry.

Each group of registers corresponding to a pixel sensor address selection mode holds Start, K, and Stop values for a different counting sequence. These values provide the inputs for the counter to set the start address value of the addressing counting scheme (Start), to set the increment value (K) by which to increment the pixel sensor address count, and to compare for an end indication (Stop). In each different mode a different pixel sensor address counting scheme will be produced. The registers for each counting sequence mode are loadable by conventional means as is known in the art, and thus their values can be changed depending upon the start location and viewing mode chosen by the user.

Start values are held in register bits 132, 144, and 156. Depending on whether mode 0, 1 or 2 is selected, one of these three register bits will place a Start value on line 170. K values are held in register bits 130, 142, and 154. Depending on whether mode 0, 1 or 2 is selected, one of these three register bits will place a K value on line 172. Stop values are held in register bits 128, 140, and 152. Depending on whether mode 0, 1 or 2 is selected, one of these three register bits will place a Stop value on line 174.

The control circuit 16 shown in FIG. 1 provides Load, Clock, and Complement signals to the flexible address generator 120 shown in FIG. 5. The Load signal 176 causes the counter state flip-flop 178 to be set to the Start value provided from the selected mode on line 170. The Clock signal 180 provides the synchronization for the state changes of the flexible address generator.

The Clock signal 180 allows the adder 182 sum output, the current count plus K, to be stored as the next counter state in flip-flop 178. As the counter state flip-flop 178 increments due to the advancing clock, it provides the current value in flip-flop 178 to the stop check 184, which comprises one inverter 186, three NAND gates 188, 190 and 192, and AND gate 194. The stop check 184 compares the current value stored in flip-flop 178 to the Stop value on line 174. When the current value stored in flip-flop 178 is equal to the Stop value and the Equal-In line 202 is asserted, the output from the stop check 184 asserts the Equal-Out line 196.

The flexible address generator 120 shown in FIG. 5 is a ripple counter, or more specifically a ripple-carry accumulator. Ripple counters are well known in the art. This device is commonly called a ripple counter since each more significant stage will receive data carried from the preceding less significant stages in order to produce a valid result. The ripple counter shown is the preferred counter embodiment for the scanning circuitry disclosed herein, but other types of digital counters could also be used to perform the counting function of the flexible address generator 120.

Each bit slice of the flexible address generator 120 contains a binary full adder 182. The full adder 182 has three inputs: A, B, and carry-in (Ci) from the previous less significant stage. The full adder 182 also has two outputs: the resulting sum S and a carry-out (Co) to the next more significant stage. The A input is taken from the K value on line 172. The Ci carry input is taken from line 198 and the Co carry output is placed on line 200.

The input ripple equal-to-stop signal (Eqi) from the previous less significant stage of the flexible address counter is carried on line 202. The output of the stop check 184 and the input ripple equal-to-stop signal (Eqi) 202 are input into AND gate 194. AND gate 194 produces the output ripple equal-to-stop signal (Eqo) carried on line 196, which is fed to the next significant stage of the flexible address generator 120. The Eqi 202 and Eqo 196 signals interconnect the various bit slices of the flexible address counter 120 such that the Eqo from the most significant stage will signify that all of the counter bits match the stop value, given that the Eqi of the least significant stage is wired to a logical 1.

The Complement signal 204 triggers the use of the complement of the output signal from flip-flop 178 in multiplexer 206 in order to reverse the counting sequence produced by the flexible address generator 120. The output address bit (Ai) 208 will be combined with the output address bits of all other bit slices of the flexible address generator 120 to determine the row or column address desired. This final row or column address is sent, respectively, to the row decoder or column selector to select the row or column address of the next desired pixel sensor.

To provide additional flexibility in the present invention, the K value used to increment the counters may be set to a non-integer value. For example, two additional bit slices can be used in the K value, allowing resolution of all starts, K's, stops, and addresses to ¼ pixel units. The two low-order extra bits are included in the counters but discarded on the way to the decoders. A formula for this example that would allow fitting the full frame more closely to a given display size is:

$$K = (1/4) * \text{ceiling } (4*\max(N/Vr, M/Vc))$$

meaning load the K register with bits equivalent to the integer:

$$\text{ceiling } (4*\max(N/Vr, M/Vc)).$$

Generalization to other powers of two is apparent to persons of ordinary skill in the art, where "4" in the above formula is replaced by $2^j$ for j fractional bits of precision.

By being included in the counters, the two extra bits allow for fine-grained control of the zoom function. For example, if K is programmed to be 2.25, and start=1, the counter will yield addresses 1, 3.25, 5.5, 7.75, 10, 12.25, 14.5, 16.75, 19, etc. This counter sequence will be truncated to 1, 3, 5, 7, 10, 12, 14, 16, 19, a sequence which usually jumps by two but jumps by three one quarter of the time, yielding an average jump of 2.25. When using such additional fractional bits, it is also possible to set K values less than 1, in which case zoom-in modes with pixel replication will be possible for imager types that allow reading of rows and columns multiple times.

It will also be apparent to persons of ordinary skill in the art that, in the case where Kn or Km are both set to zero, a single row or a single column can be replicated to fill a screen, except that the stop-detect functionality would not work for these modes.

Figure 6:
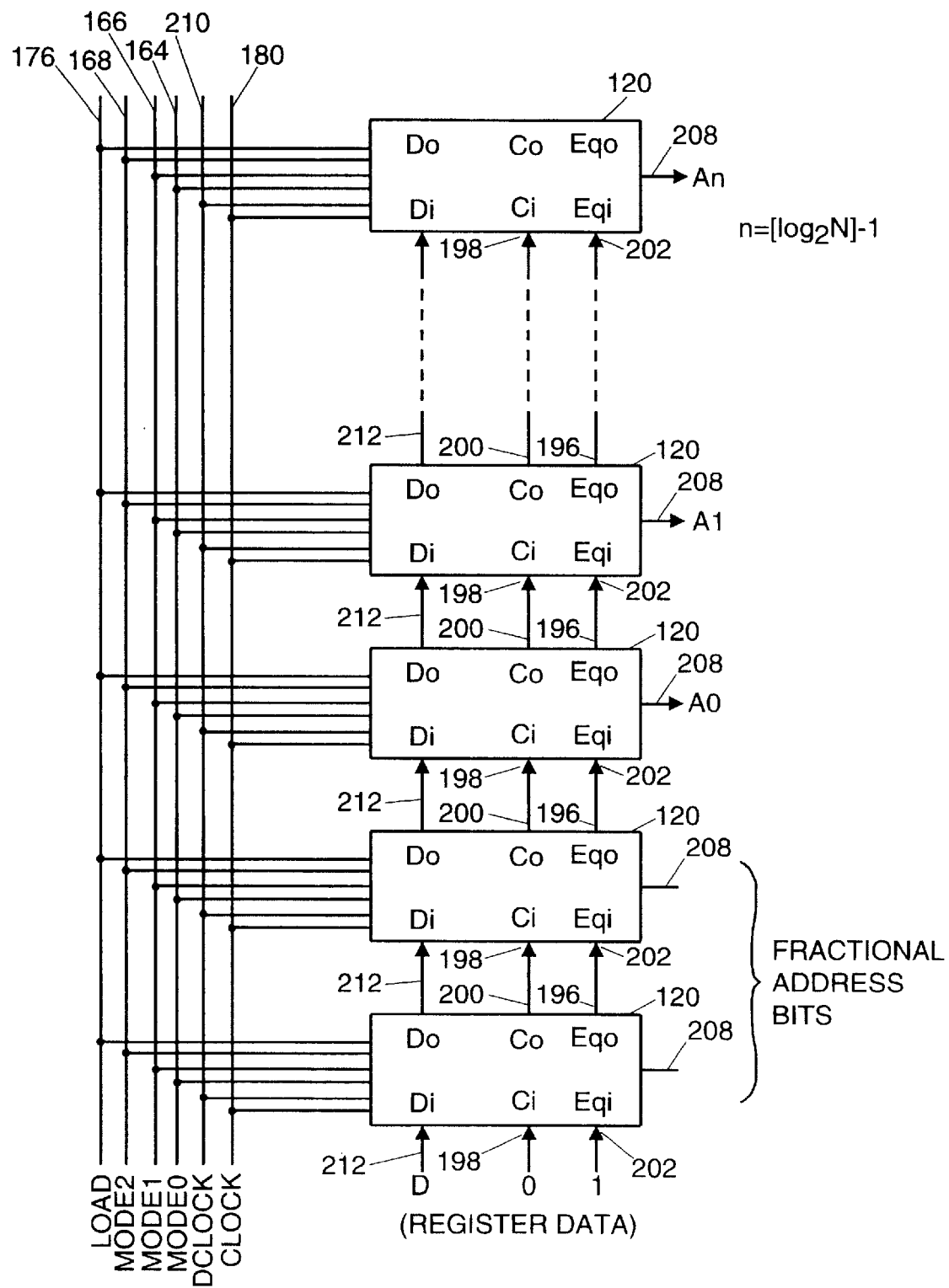
FIG. 6 is a simplified schematic diagram of a flexible address generator according to the present invention formed from a plurality of flexible address generator bit slices of FIG. 5.

Referring now to FIG. 6, a simplified schematic diagram shows an illustrative n-bit flexible address generator according to the present invention formed from a plurality of the flexible address generator bit slices 120 of FIG. 5. The two lower bit slices of the flexible address generator shown in FIG. 6 comprise two optional fractional address bits whose address outputs 208 are unused as disclosed herein.

FIG. 6 illustrates all of the interconnections between individual bit slices making up the flexible address generator. The control lines at the left of FIG. 6 are given the same reference numerals as their counterparts in FIG. 5. In addition, the Dclock control line 210 and data input serial data input line 212 are shown in FIG. 6. These lines are used to load data into the mode0, mode1, and mode2 registers 122, 124, and 126 in the conventional serial manner well known in the art. Persons of ordinary skill in the art will realize that the data input structure for the present invention could also be implemented as a parallel data input bus instead of the serial data input line 212 shown in FIG. 6.

Figure 7:
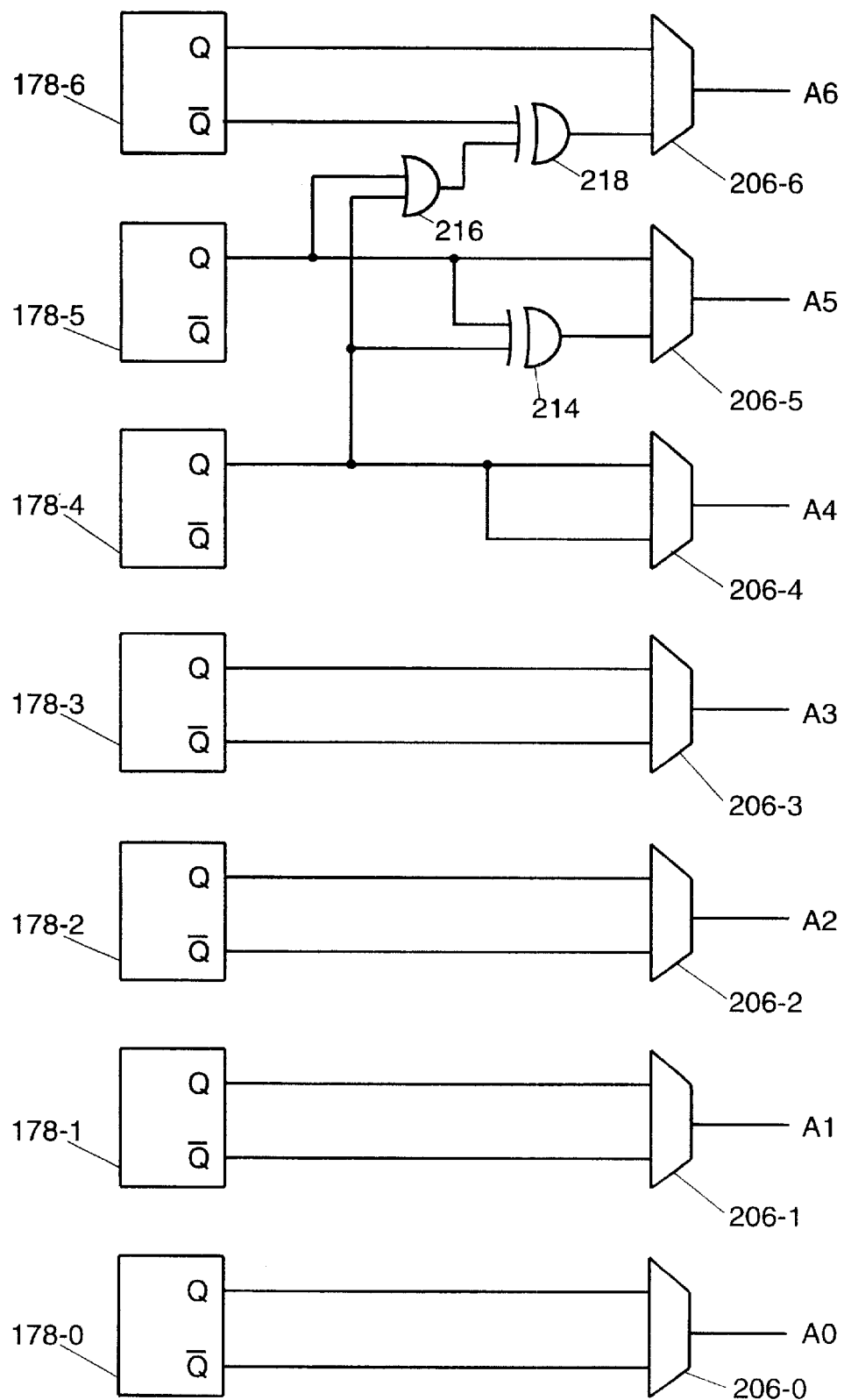
FIG. 7 is a simplified schematic diagram of an illustrative embodiment of the flexible address generator of the present invention for use where the size of the array is not equal to an exact power of two.

The present invention may also be used with arrays having a size such that N or M, or both, is not exactly equal to a power of two. FIG. 7 is a simplified schematic diagram of an illustrative embodiment of the present invention useful where, for example, N=80. This size of N lies between 64 and 128 (six and seven address bits, respectively). Therefore, the address generator will require 7 address bits.

In FIG. 7, the flip-flops and multiplexers for all seven bit slices of the flexible address generator are shown. The flip-flops are identified with reference numerals 178-0 through 178-6 and the multiplexers are identified with reference numerals 206-0 through 206-6. In each case, the reference numeral suffix indicates the address bit with which the circuit elements in FIG. 7 are associated.

As indicated in FIG. 7, the connections between the flip-flops and the multiplexers for address bits 0 through 3 are as shown in the bit slice of FIG. 5. The connections between the flip-flops 178-4, 178-5, and 178-6 and their respective multiplexers 206-4, 206-5, and 206-6 are made as shown in FIG. 6 to implement the complementation with respect to the highest address of 79. Specifically, the inputs of multiplexer 206-4 are both connected to the Q output of flip-flop 178-4. The second input of multiplexer 206-5 is driven from XOR gate 214, taking its two inputs from the Q outputs of flip-flops 178-4 and 172-5. The second input of multiplexer 206-6 is driven from OR gate 216 and XOR gate 218. The two inputs to OR gate 216 are taken from the Q outputs of flip-flops 178-4 and 178-5 and the two inputs to XOR gate 218 are taken from the Q output of flip-flop 178-6 and the output of OR gate 216.

The above-described circuit implements the binary function of 127−(A+48) or 79−A, the extra logic adding 48 and then inverting in the lower paths into the complement multiplexers 206-4, 206-5, and 206-6. The circuit of FIG. 7 avoids the need for a different START value in the channel with complementing, although such a circuit is also contemplated according to the present invention.

While embodiments and applications of this invention have been shown and described, it would be apparent to those skilled in the art that many more modifications than mentioned above are possible without departing from the inventive concepts disclosed herein. The invention, therefore, is not to be restricted except in the spirit of the appended claims.

What is claimed is:

1. A scanning circuit integrated onto a semiconductor substrate with an active pixel sensor array, comprising:
   a row-address generator configured to generate row addresses starting from a row-start address and incrementing by a row-increment value, wherein said row-start address and said row-increment value are stored within said row-address generator;

a column-address generator configured to generate column addresses starting from a column-start address and incrementing by a column-increment value, wherein said column-start address and said column-increment value are stored within said column-address generator;

row-address generator data loading circuitry coupled to said row-address generator and configured to load said row-start address and said row-increment value into said row-address generator;

column-address generator data loading circuitry coupled to said column-address generator and configured to load said column-start address and said column-increment value into said column-address generator;

a row decoder coupled to said row-address generator;

a column selector coupled to said column-address generator;

a plurality of row select lines coupled to said row decoder, each one of said row select lines associated with a different row in said active pixel sensor array; and a plurality of column output lines coupled to said column selector, each one of said column output lines associated with a different column in said active pixel sensor array.

2. The scanning circuit of claim 1 wherein:

said row-address generator is further configured to stop at a loadable row-stop address;

said row-address generator data loading circuitry is further configured to load said row-stop address into said row-address generator;

said column-address generator is further configured to stop at a loadable column-stop address; and said column-address generator data loading circuitry is further configured to load said column-stop address into said column-address generator.

3. The scanning circuit of claim 1 wherein said row-address generator further includes a complementor to reverse an order in which said row select lines are selected.

4. The scanning circuit of claim 1 wherein said column-address generator further includes a complementor to reverse an order in which said column output lines are selected.

5. The scanning circuit of claim 1 further including;

row storage circuitry coupled to said row-address generator data loading circuitry for storing a plurality of said row-increment values and a plurality of said row-start addresses;

column storage circuitry coupled to said column-address generator data loading circuitry for storing a plurality of said column-increment values and a plurality of said column-start addresses.

6. A scanning circuit integrated onto a semiconductor substrate with an active pixel sensor array comprising:

a row-address generator configured to generate row addresses starting from a row-start address and incrementing by a row-increment value;

multiple row-start registers for storing a plurality of said row-start addresses and multiple row-increment registers for storing a plurality of said row-increment values for different readout modes within said row-address generator;

a column-address generator configured to generate column addresses starting from a column-start address and incrementing by a column-increment value;

multiple column-start registers for storing a plurality of said column-start addresses and multiple column-increment registers for storing a plurality of said column-increment values for different readout modes within said column-address generator;

a row decoder connected to said row-address generator;

a column selector connected to said column-address generator;

a plurality of row select lines connected to said row decoder, each one of said row select lines associated with a different row in said active pixel sensor array; and a plurality of column output lines connected to said column selector, each one of said column output lines associated with a different column in said active pixel sensor array.

7. The scanning circuit of claim 6 wherein:

said multiple row-start address registers are also for storing row-stop addresses; and said multiple column-start address registers are also for storing column-stop addresses.

8. The scanning circuit of claim 6 wherein said row-address generator and said column-address generator implement a zoom scanning mode by means of skipping selected rows and columns of said active pixel sensor array, wherein said row-increment value stored in one of said row-increment registers and said column-increment value stored in one of said column-increment registers have magnitudes greater than 1.

9. The scanning circuit of claim 8 wherein said row-increment value and said column-increment value are stored as integer values.

10. The scanning circuit of claim 8 wherein said row-increment value and said column-increment value are stored with binary fraction portions and said row-address counter and said column-address counter each have outputs truncated to integer values.

11. A scanning circuit integrated onto a semiconductor substrate with an active pixel sensor array, comprising:

an input operable to receive at least a row-start address, a column-start address, and a column-increment value, said column-increment value being a numeric value;

a row-address generator configured to generate row addresses starting from said row-start address and incrementing by a row-increment value;

a column-address generator configured to generate column addresses starting from said column-start address and incrementing by said column-increment value;

a row decoder coupled to said row-address generator;

a column selector coupled to said column-address generator;

a plurality of row select lines coupled to said row decoder, each of said row select lines associated with a different row in said active pixel sensor array; and a plurality of column output lines coupled to said column selector, each of said column output lines associated with a different column in said active pixel sensor array.

12. The scanning circuit of claim 11 wherein said row-increment value is equal to said column-increment value.

13. The scanning circuit of claim 11 wherein said row-increment value is received by said input independently of said column-increment value.

14. A scanning circuit integrated onto a semiconductor substrate with an active pixel sensor array, comprising:

a multiplicity of loadable registers, including at least a column-start register and a column-increment register, each loadable register being operable to store a numeric value;

a column-address generator configured to generate column addresses starting from a column-start address and incrementing by a column-increment value, wherein said column-start address is stored in said column-start register, and said column-increment value is stored in said column-increment register;

a column selector coupled to said column-address generator; and a plurality of column output lines coupled to said column selector, each one of said column output lines associated with a different column in said active pixel sensor array.

15. A scanning circuit integrated onto a semiconductor substrate with an active pixel sensor array, comprising:

an input operable to receive at least a column-start address and a column-increment value, said column-increment value being a numeric value;

a column-address generator configured to generate column addresses starting from said column-start address and incrementing by said column-increment value;

a column selector coupled to said column-address generator; and a plurality of column output lines coupled to said column selector, each of said column output lines associated with a different column in said active pixel sensor array.

* * * * *